(No Model.) 2 Sheets—Sheet 1.
J. BUTCHER.
CYCLOMETER.
No. 270,737. Patented Jan. 16, 1883.
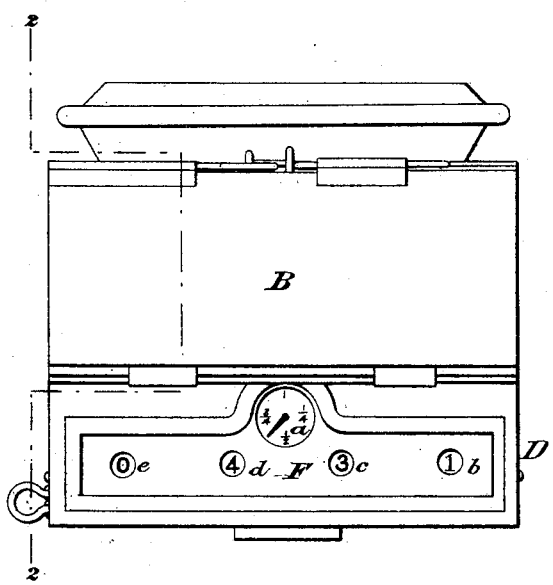
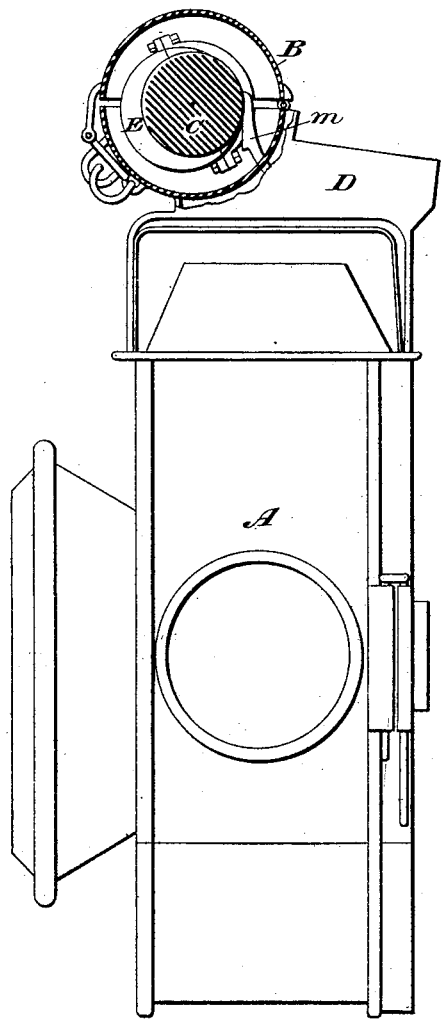
WITNESSES:
E. B. Bolton
Geo. Bainton
INVENTOR:
Joseph Butcher
By his Attorneys,
Dunke, Fraser & Connett.

(No Model.) 2 Sheets—Sheet 2.

J. BUTCHER.
CYCLOMETER.

No. 270,737. Patented Jan. 16, 1883.

WITNESSES:
E. B. Bolton
Geo. Bainton

INVENTOR:
Joseph Butcher
By his Attorneys,
Burke, Fraser & Connett

UNITED STATES PATENT OFFICE.

JOSEPH BUTCHER, OF PROVIDENCE, RHODE ISLAND.

CYCLOMETER.

SPECIFICATION forming part of Letters Patent No. 270,737, dated January 16, 1883.

Application filed April 3, 1882. (No model.)

*To all whom it may concern:*

Be it known that I, JOSEPH BUTCHER, a citizen of the United States, residing in the city of Providence, in the county of Providence and State of Rhode Island, have invented certain useful Improvements in Cyclometers, of which the following is a specification.

My invention relates to a means for determining and recording the distance traveled over by a vehicle, being especially intended for use in connection with a hub-lamp in a velocipede or bicycle.

It is a common custom to hang a lamp on the axle of a bicycle, its weight being sufficient to keep it suspended vertically, and it has been proposed also to connect with these a registering and recording mechanism driven continuously from the axle of the wheel to show the distance traveled over by the rider. All of these mechanisms, so far as I am aware, have been driven continuously from the axle, some by worm-wheels and others by toothed gears; and none of them, so far as I am aware, is arranged to register over one hundred miles. The registering and recording mechanisms in use have the dials upon which the distance traveled is recorded arranged vertically, and it is necessary, when using them, to stop and descend before they can be inspected.

The object of my invention is to provide a perpetual register, or one that will at least record as many miles as may be traveled over in a season or year. This register operates intermittently, each revolution of the bicycle-wheel moving the hand which registers the fractions of a mile its proper distance. The mechanism cannot be disturbed by jolting, and the dial-face of the register is placed in a horizontal position, so as to be visible from the rider's seat, whereby the rider may at any time note the distance he has traveled.

The novel features of the invention will be set forth in the claims.

Figure 3:
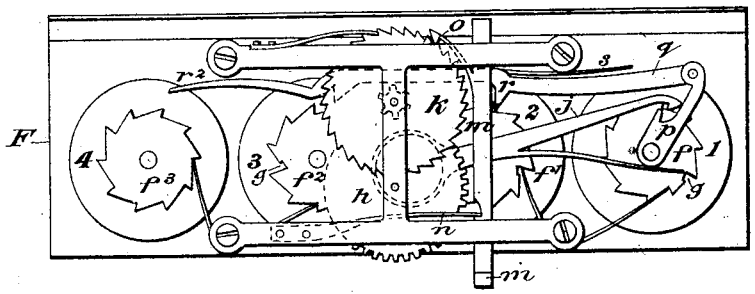
Figure 5:
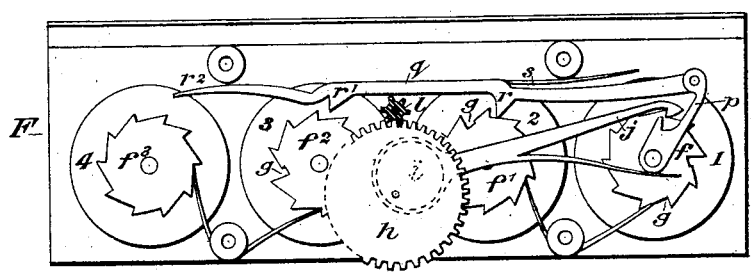
Figure 4:
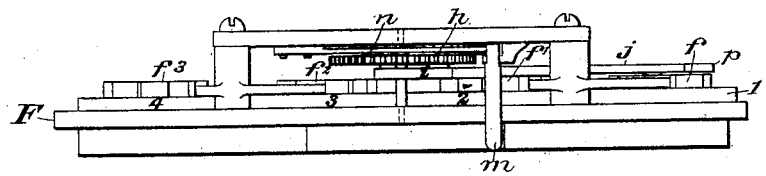
Figure 6:
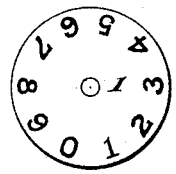
Figure 7:
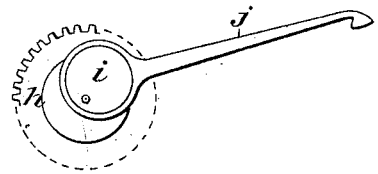

In the drawings, which serve to illustrate my invention, Figure 1 is a plan view of the cyclometer and the lamp to which it is attached; and Fig. 2 is a side elevation of the same, the lamp-bearing being in section on line 2 2 in Fig. 1. Fig. 3 shows the under side of the registering mechanism removed from its case in the lamp and drawn to a larger scale than Figs. 1 and 2. Fig 4 is a front or edge view of Fig. 3; and Fig. 5 is a view similar to Fig. 3, but with some of the superior parts removed. Figs. 6 and 7 are detail views, which will be hereinafter more fully described.

A is an ordinary hub-lamp of a bicycle; B, its sectional bearing, by which it is suspended from the axle, and C is the axle.

D is a case or receptacle formed on the shell of the lamp to receive the cyclometer mechanism, and E is an operating eccentric or cam, made in halves and secured to the axle C. This eccentric serves to operate the pawl-slide, which effects the registering of the wheel revolutions.

F in Fig. 1 is the face or dial plate of the cyclometer, which is provided with a dial, $a$, the indicator or hand on which registers fractions of a mile. It is also provided with apertures $b$, $c$, $d$, and $e$, through which may be seen numerals that indicate the miles traveled. The numeral at $b$ indicates units, at $c$ tens, at $d$ hundreds, and at $e$ thousands. Thus it will be seen that the cyclometer is capable of registering and recording up to ten thousand miles.

Referring now to Figs. 3, 4, and 5, which illustrate the cyclometer mechanism, on the back of the plate F are rotatively mounted disks 1, 2, 3, and 4, on the faces of which are marked the numerals 1 to 0. The face of one of these disks is shown in Fig. 6. On the backs of these disks are fixed ratchet-wheels $f f' f^2 f^3$, each of which has ten teeth. At one point, $g$, the recess between the teeth is made deeper than at the other points. The purpose of this will be hereinafter explained. By rotating the disks 1 2, &c., the numerals on their faces are brought in succession opposite the openings $b\ c\ d$, &c.

Mounted on the same spindle with the hand or indicator of the fraction-dial $a$ is a toothed wheel, $h$, having sixty teeth, and fixed to this is an eccentric, $i$, arranged to give motion to a pawl, $j$. This wheel, eccentric, and pawl are shown detached in Fig. 7. The hook on the end of this pawl engages the teeth of ratchet $f$ on disk 1. A main or driving ratchet-wheel, $k$, bears a pinion, $l$, which has six teeth, and this pinion meshes with the wheel $h$. The number of teeth in the ratchet-wheel $k$ depends upon the size of the large wheel of the bicycle. If this wheel is fifty-two inches in diameter, the ratchet will have thirty-nine teeth, and if fifty inches in diameter the ratchet will have forty teeth. The ratio or proportion must be such that the revolutions of the bicycle-wheel will register the proper distance traveled over on the dial $a$, as will be hereinafter explained.

Referring to Figs. 2 and 3, $m$ is the pawl-slide or operating-slide, which is mounted in the back frame or plate of the cyclometer, and is provided with a toe against which the eccentric E impinges as the axle C rotates. The eccentric moves the slide in one direction and a spring, $n$, retracts it. On the slide $m$ is mounted a spring-pawl, $o$, which elastically engages the teeth of the ratchet-wheel $k$.

So far as described the operation is as follows: At each rotation of the axle the eccentric E presses in the pawl-slide $m$, and then permits it to draw back, thus causing the spring-pawl it bears to move the ratchet-wheel $k$ around one tooth in a manner common in ratchets. This rotation of the ratchet-wheel imparts slow rotation to the wheel $h$ through the pinion $l$. One revolution of the wheel $h$ causes one revolution of the hand on dial $a$ and indicates one mile traveled. The rotation of wheel $h$, however, also causes a reciprocating movement of the pawl $j$ through the eccentric $i$, and the hook on the said pawl moves the ratchet $f$ on the unit-disk 1 the space of a tooth, or one-tenth of a revolution.

On the axis of the unit-disk is mounted loosely or independently an arm, $p$, and to the free end of this arm is jointed a pawl-bar, $q$, which is provided with three pawls, $r$ $r'$ $r^2$, arranged to engage respectively the ratchets $f'$ $f^2$ $f^3$ on the disks 2 3 4 at the proper times. This pawl-bar is kept pressed elastically up toward the several ratchets by means of a suitable spring, $s$. The construction and arrangement of the pawl-bar are such that when the pawl $r$ rests in any one of the shallow notches in the ratchet $f'$ the pawls $r'$ $r^2$ will be lifted above the ratchets $f^2$ $f^3$; but when it falls into the deep notch $g$ in said ratchet the pawl $r'$ is permitted to engage an ordinary notch in ratchet $f^2$, and when the pawl $r'$ falls into the deep notch in ratchet $f^2$ it permits the pawl $r^2$ to engage the teeth of the ratchet $f^3$. There is no necessity for a deep notch in this last ratchet.

I will now describe the operation of the devices last mentioned, which register tens, hundreds, and thousands of miles traveled.

When the wheel $h$ has made ten revolutions the hook on the pawl $j$ will drop into the tenth or deep notch $g$ of the ratchet $f$. This hook, which projects out beyond the face of the ratchet, (being thicker,) now takes into a recess in the arm $p$, and in its next movement this arm is borne forward, carrying with it the pawl-bar $q$. The pawl $r$ on said bar, being engaged with the teeth of ratchet $f'$, moves it the space of one tooth, thus registering ten miles. Thus ten revolutions of disk 1 effect one revolution of disk 2, and ten revolutions of disk 2 effect one revolution of disk 3, and so on through the series. After ten thousand miles have been recorded the register begins anew. By noting down the state of the register at starting on a trip or run and subtracting this from the state ascertained at the end of the run it is easily seen what the distance traveled has been.

No amount of jarring or jolting will affect the registering mechanism, and even a severe accident to the bicycle will not disturb it, as it is compact and so set as to be well protected. I prefer to cover the dial or face plate with thick glass well set to keep out dust.

Each of the several ratchet-wheels in the cyclometer is suitably provided with a spring stop or check to prevent its turning backward.

My improved recording mechanism might be mounted on the lamp in any manner desired; but I prefer to arrange it as shown—that is to say, to arrange the receptacle D back of the sectional bearing B and below the axle. The receptacle is also made to conform in length to the width of the lamp-body, in order that projections may be avoided as far as possible. By this arrangement the weight of the recording mechanism is brought below the point of suspension, and the mechanism is protected against injury.

So far as I am aware it has been customary heretofore to mount the recording mechanism over the axle and in an exposed position.

Having thus described my invention, I claim—

1. A hub-lamp for a bicycle, provided with a sectional bearing for the bicycle-axle, attached to its top, and a receptacle, D, formed in its top below the level of the axle-bearing to receive and house the registering mechanism, substantially as and for the purposes set forth.

2. The combination, with a hub-lamp for a bicycle, provided with a receptacle, D, to receive the recording mechanism, of the recording mechanism described, mounted in said receptacle D, and its operating-lever $m$, arranged to project through the back wall of said casing, as shown, and the sectional bearing B of the lamp, the fixed lower half of said section being arranged to form the back wall of the receptacle D, all substantially as set forth.

3. The combination, with the lamp A and the sectional bearing B, attached to its top, of the receptacle D to receive the recording mechanism, and the said recording mechanism arranged therein, said receptacle and its contained mechanism being equal in length to the width of the lamp, and arranged back of and below the axle-bearing, substantially as and for the purposes set forth.

4. The combination, in a cyclometer, of a reciprocating pawl-slide and pawl, a ratchet-wheel, $k$, bearing a pinion, $l$, the said pinion, a toothed wheel, $h$, an eccentric, $i$, on said wheel, a pawl, $j$, arranged to engage a ratchet, $f$, on the unit-disk, and the said ratchet and disk, all constructed and arranged to operate substantially as set forth.

5. The combination, in a cyclometer, of the reciprocating pawl $j$, the ratchet $f$, with nine shallow notches and one deep notch, arm $p$, the pawl-bar $q$, provided with its series of pawls, and the series of ratchets with which said pawls are arranged to engage, all arranged substantially as herein set forth.

6. The combination, with the lamp, the axle, and the eccentric mounted thereon, of the dial or face plate of the cyclometer, bearing the dial $a$ and its hand, and having four apertures, $b$ $c$ $d$ $e$, the pawl-slide and its pawl, the main ratchet-wheel $k$, pinion $l$, toothed wheel $h$, eccentric $i$, pawl $j$, arm $p$, pawl-bar $q$, bearing-pawls $r$ $r'$ $r^2$, disks 1 2 3 4, and the several ratchets affixed thereto, all constructed and arranged to operate substantially as set forth.

In witness whereof I have hereunto signed my name in the presence of two subscribing witnesses.

JOSEPH BUTCHER.

Witnesses:
HENRY CONNETT,
ARTHUR C. FRASER.